(12) United States Patent
Kuryo

(10) Patent No.: US 8,873,163 B2
(45) Date of Patent: Oct. 28, 2014

(54) LENS BARREL AND LENS UNIT

(75) Inventor: Keisuke Kuryo, Sakai (JP)

(73) Assignee: Konica Minolta Advanced Layers, Inc. (JP)

( * ) Notice: Subject to any disclaimer, the term of this patent is extended or adjusted under 35 U.S.C. 154(b) by 32 days.

(21) Appl. No.: 13/617,698

(22) Filed: Sep. 14, 2012

(65) Prior Publication Data

US 2013/0070345 A1 Mar. 21, 2013

(30) Foreign Application Priority Data

Sep. 21, 2011 (JP) .................................. 2011-205884

(51) Int. Cl.
*G02B 15/14* (2006.01)
*G02B 7/10* (2006.01)

(52) U.S. Cl.
CPC ...................................... *G02B 7/102* (2013.01)
USPC ........................................................ 359/700

(58) Field of Classification Search
USPC .......................... 359/700, 694, 699, 826, 811
See application file for complete search history.

(56) References Cited

U.S. PATENT DOCUMENTS 7,408,722 B2 * 8/2008 Ishizuka et al. ................ 359/701
8,570,665 B2 * 10/2013 Uemura ......................... 359/700

FOREIGN PATENT DOCUMENTS

JP 2-44247 Y2 11/1990

* cited by examiner

*Primary Examiner* — Tuyen Tra
(74) *Attorney, Agent, or Firm* — Cantor Colburn LLP

(57) ABSTRACT

A lens barrel and a lens unit of the present invention each include a cam drum having a cam groove, a lens holding frame for holding a moving lens group, and a cam follower installed on an outer periphery of the lens holding frame. The cam groove has two groove side walls, and an inclined wall that extends outward in a radial direction of the cam drum from one of the two groove side walls to the other thereof, and the cam follower has a contact member that contacts the inclined wall and a cam follower main unit respectively, and a biasing member that biases the contact member outward in the radial direction.

21 Claims, 13 Drawing Sheets

LENS BARREL AND LENS UNIT

FIELD OF THE INVENTION

The present invention relates to a lens barrel and a lens unit used for a projector, a camera and the like.

BACKGROUND ART

A conventionally known lens barrel includes: a cam drum having a cam groove, a lens holding frame holding a moving lens group; and a cam follower installed on the outer periphery of the lens holding frame, wherein the lens holding frame moves in the axial direction of the cam drum by the cam follower movably engaging with a groove side wall of the cam groove and moving along the cam groove. In this lens barrel using a cam driving mechanism as above, the lens holding frame backlashes upon zooming due to a slight gap between the cam follower and the cam groove, for example, and an image wobbling occurs. Furthermore with the increased number of pixels and the reduced size of the image sensor of the video camera, digital camera and the like in recent years, the optical performance of each lens is becoming more sensitive in a zoom lens, and a slight backlashing of the lens holding frame upon zooming influences the decline of the imaging performance.

An available technology to prevent the backlashing of the lens holding frame upon zooming is a technology disclosed in Japanese Examined Utility Model Application Publication No. H2-44247. According to this technology, the cam follower is formed of two members (cam pins) having a tapered portion at the tip, where the outer periphery of one of the members is inter-fitted with an inter-fit concave portion formed on the other member, and the cam follower is pressed by V-shaped cam grooves created in the fixed drum and the cam drum respectively, by a spring biasing outward in a radial direction.

In the case of the technology disclosed in Japanese Examined Utility Model Application Publication No. H2-44247, however, the two cam followers inter-fit, therefore the lens holding frame could incline by the backlash generated in the cam follower radial direction, that is, the cam drum axial direction, due to the dimensional difference between the diameters of the two cam followers.

SUMMARY OF THE INVENTION

With the foregoing in view, it is an object of the present invention to provide a lens barrel and a lens unit in which a lens holding frame hardly backlashes in the radial direction and the axial direction of the cam drum and hardly inclines with respect to the cam drum.

The lens barrel and the lens unit according to the present invention includes: a cam drum having a cam groove; a lens holding frame for holding a moving lens group; and a cam follower installed on an outer periphery of the lens holding frame, wherein the cam groove has two groove side walls and an inclined wall that extends outward in a radial direction of the cam drum from one of the groove side walls to the other thereof, and the cam follower has a contact member that contacts the inclined wall and a cam follower main unit respectively, and a biasing member that biases the contact member outward in the radial direction. Therefore in the lens barrel and the lens unit having this configuration, the lens holding frame hardly backlashes in the radial direction and the axial direction of the cam drum, and hardly inclines with respect to the cam drum.

These and other objects, features and advantages of the present invention will become more apparent upon reading the following detailed description along with the accompanying drawings.

DESCRIPTION OF THE PREFERRED EMBODIMENTS

An embodiment of the present invention will now be described with reference to the drawings. In each drawing, same constituents are denoted with a same reference symbol, on which redundant description is omitted unless necessary.

Figure 1:
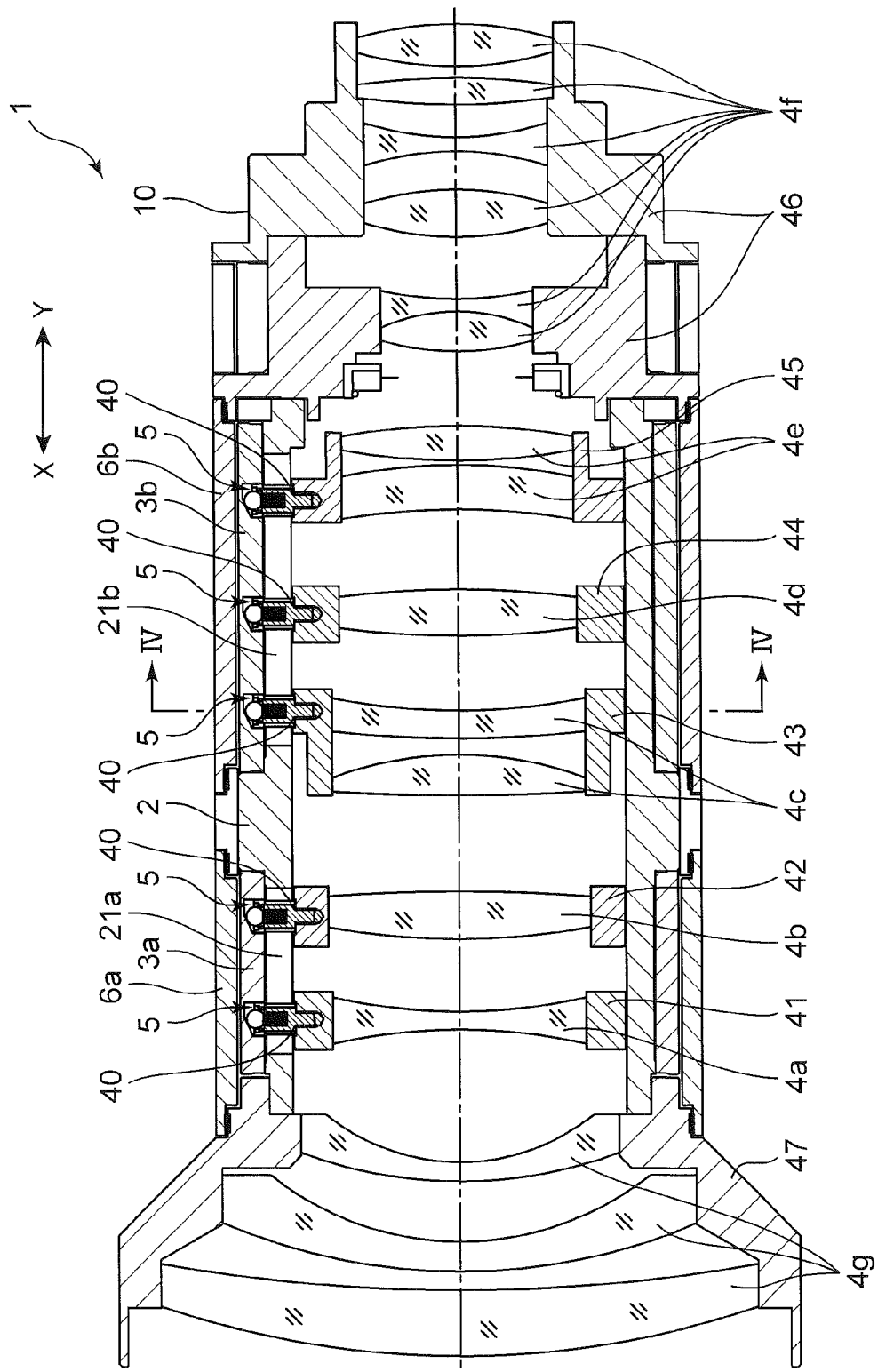
FIG. 1 is a cross-sectional view of a lens unit having a lens barrel according to an embodiment of the present invention.
Figure 2:
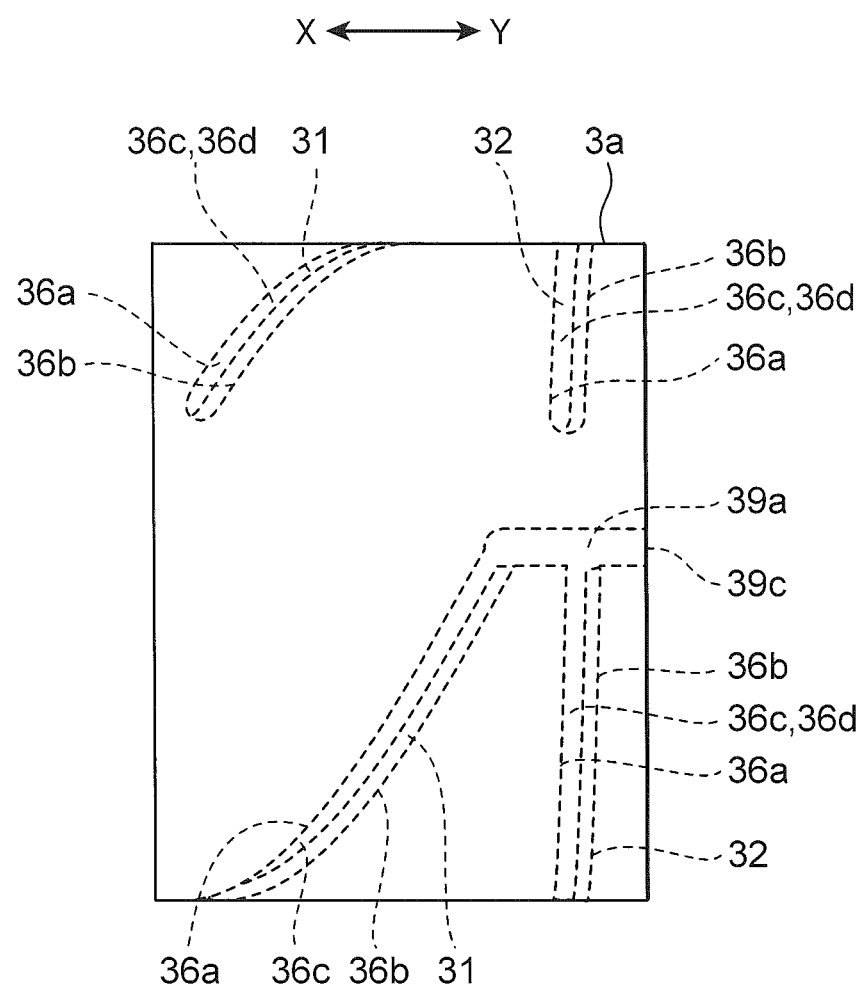
FIG. 2 is a plan view of a first cam drum in FIG. 1.
Figure 3:
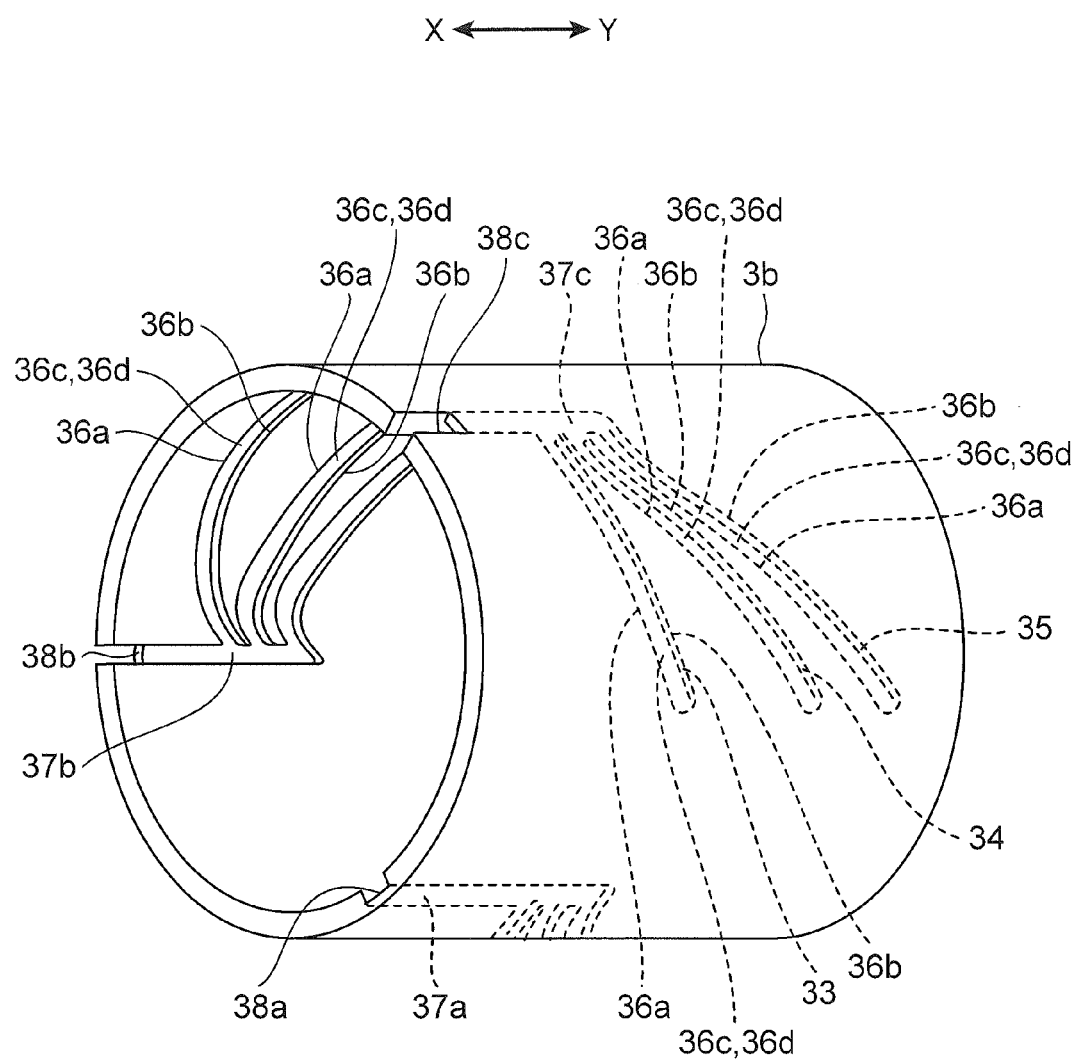
FIG. 3 is a perspective view of a second cam drum in FIG. 1.
Figure 4:
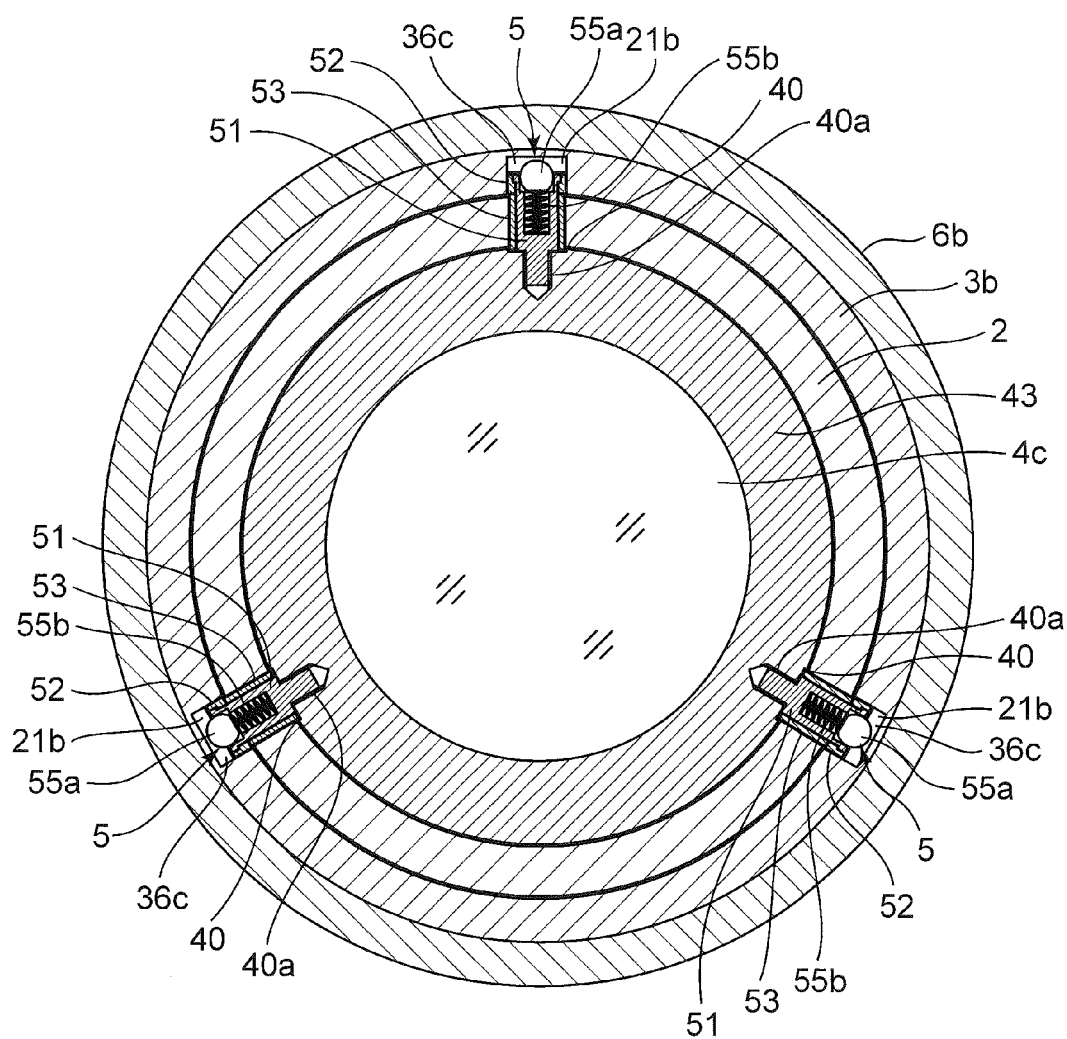
FIG. 4 is a cross-sectional view sectioned at the IV-IV line in FIG. 1.
Figure 5:
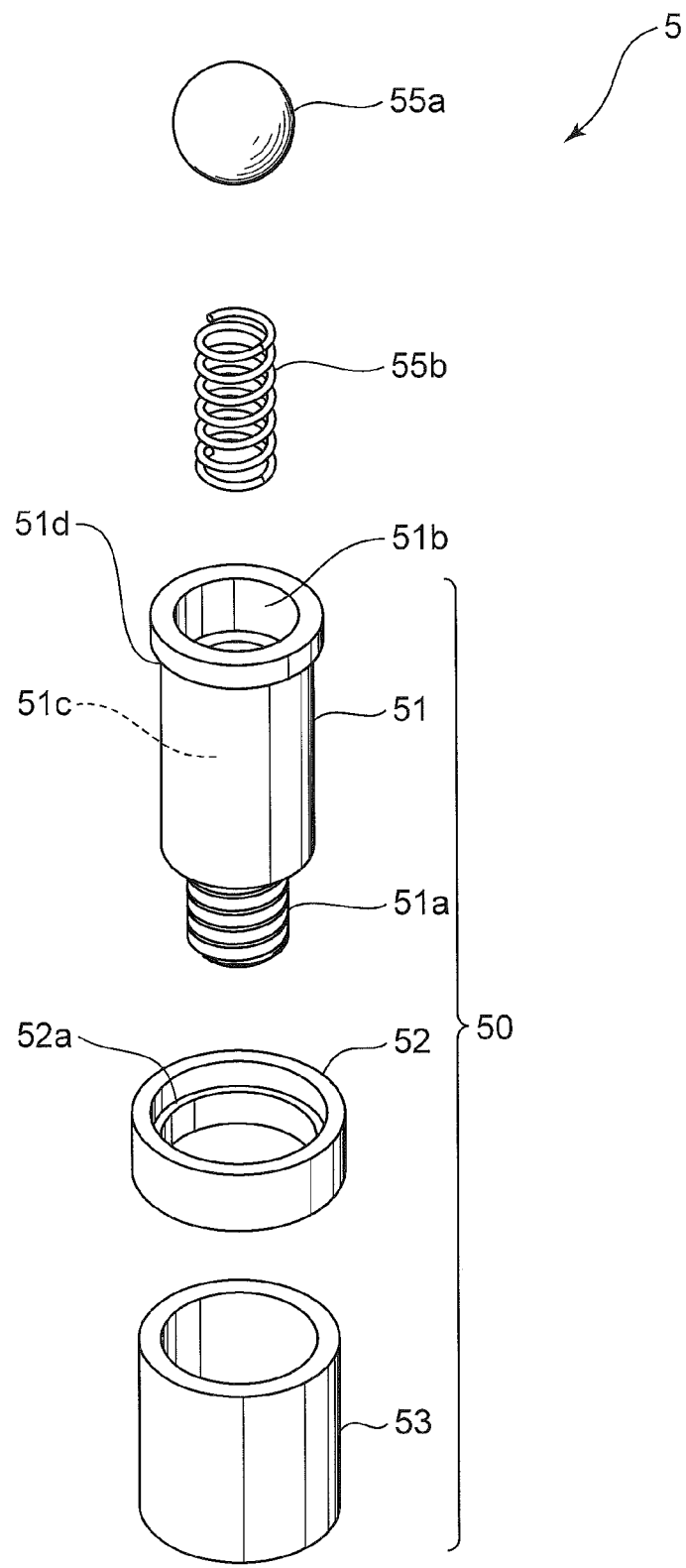
FIG. 5 is an exploded perspective view of a cam following in FIG. 1.

FIG. 1 is a cross-sectional view depicting a lens unit having a lens barrel of an embodiment of the present invention. FIG. 2 is a plan view of a first cam drum in FIG. 1. FIG. 3 is a perspective view of a second cam drum in FIG. 1. FIG. 4 is a cross-sectional view sectioned at the IV-IV line in FIG. 1. FIG. 5 is an exploded perspective view of a cam follower in FIG. 1. In the description, the X direction in the drawing indicated by an arrow is the front side (object side), and the Y direction in the drawing indicated by an arrow is the rear side (image side).

The lens unit 1 of this embodiment is for imaging and has a lens barrel 10 and lens groups 4a to 4g, as FIG. 1 shows. The lens groups are a first liens group 4a and a second lens group 4b which are moving lens groups that function as a focus mechanism unit, a third lens group 4c, a fourth lens group 4d, and a fifth lens group 4e which are moving lens groups that function as a zoom mechanism unit, and a sixth lens group 4f and a seventh lens group 4g which are fixed lens groups. Each of these lens groups is constituted by one or a plurality of lenses.

The lens barrel 10 includes a cylindrical fixed drum 2 and cylindrical cam drums 3a and 3b, cylindrical first lens holding frame 41 to seventh lens holding frame 47 which hold the first lens group 4a to the seventh lens group 4g, and a plurality of cam followers 5 attached to the first lens holding frame 41 to the fifth lens holding frame 45.

Figure 7:
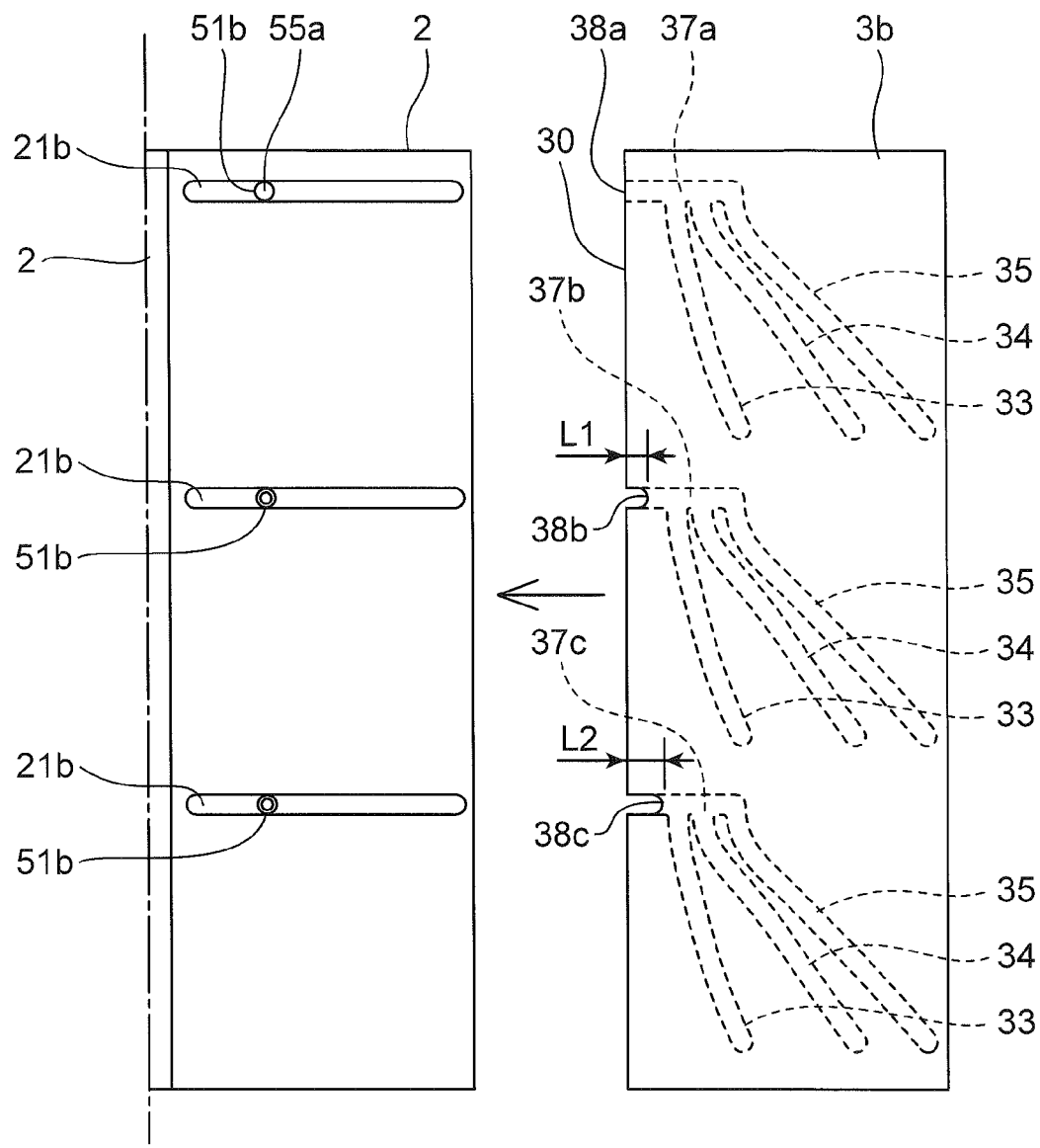
FIG. 7 is an opened view depicting a case of engaging the cam follower installed on the lens holding frame with the fixed drum and the cam drum.

The fixed drum 2 has a first guide groove 21a which extends on the periphery surface on the front side in the axial direction (optical axial direction) so as to penetrate from the inner periphery surface to the outer periphery surface, and a second guide groove 21b which extends on the periphery surface on the rear side in the axial direction (optical axial direction) so as to penetrate from the inner periphery surface to the outer periphery surface (see FIG. 7). FIG. 7 to FIG. 10 show the developed state of the cylindrical fixed drum 2 and the later mentioned cylindrical second cam drum 3b, and the front side of the fixed drum 2 where the first guide groove 21a is formed is omitted in the FIG. 7 to FIG. 10. In other words, in FIG. 7 to FIG. 10, the first guide groove 21a is not shown, only the second guide groove 21b is shown.

The first guide groove 21a engages with the first lens group 4a and the second lens group 4b, and guides these lens groups in the optical axial direction, and the second guide groove 21b engages with the third lens group 4c to the fifth lens group 4e, and guides these lens groups in the optical axial direction.

The second guide groove 21b is constituted by three guide grooves disposed at an equal interval in the circumferential direction, as shown in FIG. 4 and FIG. 7. The first guide groove 21a, which is not illustrated, has approximately the same configuration as the second guide groove 21b, and is constructed by three guide grooves disposed at an equal interval in the circumferential direction. The first guide groove 21a and the second guide groove 21b have the same width.

In this embodiment, the cam drum 3 is constituted by two members, i.e., a first cam drum 3a engaged with the first lens group 4a and the second lens group 4b, and a second cam drum 3b engaged with the third lens group 4c to the fifth lens group 4e.

The second cam drum 3b will be described first. As FIG. 3 and FIG. 7 show, the second cam drum 3b has cam grooves 33 to 35, which are formed on the inner periphery surface so as to extend obliquely with respect to the front-rear direction.

The cam groove of the second cam drum 3b is constituted by three types of cam grooves, i.e., a third cam groove 33 which is disposed on the front most side and engages with the third lens group 4c, a fourth cam groove 34 which is disposed behind the third cam groove 33 and engages with the fourth lens group 4d, and a fifth cam groove 35 which is disposed behind the fourth cam groove 34 and engages with the fifth lens group 4e.

The third cam groove 33 to the fifth cam groove 35 are constituted by three sets of cam grooves having a same configuration, disposed at an equal interval in the circumferential direction respectively.

The cross-sectional shapes of the third cam groove 33 to the fifth cam groove 35 are the same. The cross-sectional shape will be described taking the third cam groove 33 as an example.

Figure 6:
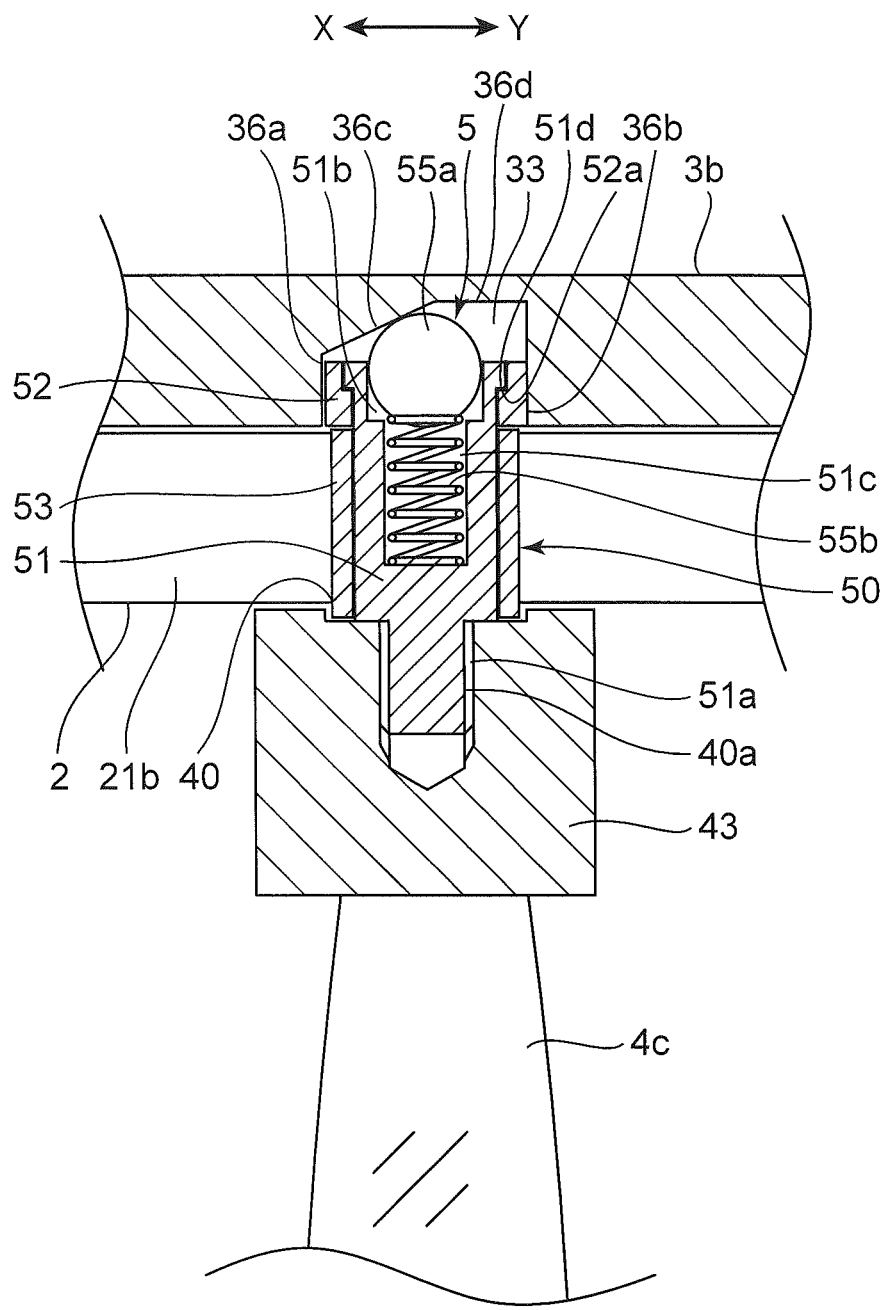
FIG. 6 is an enlarged cross-sectional view of a key section in a state where the cam follower installed on the lens holding frame is engaged with the fixed drum and the cam drum.

As FIG. 6 shows, the third cam groove 33 has a groove front side wall 36a, a groove rear side wall 36b, and an inclined wall 36c.

The groove front wall 36a is formed along the radial direction as the cross-sectional view in FIG. 6 shows. The groove rear wall 36b is disposed behind the groove front side wall 36a in the axial direction so as to face the groove front side wall 36a with a predetermined distance therebetween.

The inclined wall 36c is formed from the groove front side wall 36a (one side) to the groove rear side wall 36b (the other side) outward in the radial direction, so as to extend up and backward obliquely. According to this embodiment, the inclined wall 36c is formed to have approximately a 25° angle with respect to the axial direction (optical axial direction). More specifically, in the example shown in FIG. 6, the inclined wall 36c extends up and backward obliquely from one end of the groove front side wall 36a. Further, the inclined wall 36c connects to one end of the groove rear side wall 36b via a parallel wall 36d extending in parallel to the axial direction. The inclined wall 36c may extend up and backward obliquely from one end of the groove front side wall 36a, and may directly connects to one end of the groove rear side wall 36b without the parallel wall 36d.

The second cam drum 3b of this embodiment has, guide grooves 37a to 37c connected with the third cam groove 33 to the fifth cam groove 35 respectively on the inner periphery surface, as shown in FIG. 3 and FIG. 7.

The guide groove 37 is for guiding the cam follower 5 into the third cam groove 33 to the fifth cam groove 35 respectively, and is constituted by three guide grooves, i.e., the first guide groove 37a, the second guide groove 37b and the third guide groove 37c formed for the third cam groove 33 to the fifth cam groove 35 respectively.

The first guide groove 37a to the third guide groove 37c are formed so as to extend along the axial direction (front to rear direction) from the edge of the fifth cam groove 35 to the front end face 30 of the second cam drum 3b via the edge of the fourth cam groove 34 and the edge of the third cam groove 33.

The first guide groove 37a to the third guide groove 37c have inlets 38a to 38c respectively which are located on the tip of the front end face 30 of the second cam drum 3b. The distance of each inlet from the front end face 30 of the second cam drum 3b is longer in the sequence of the inlet 38a to the inlet 38c.

More specifically, in this embodiment, the inlet 38a of the first guide groove 37a is formed to be in a same position as the front end face 30, that is to have a zero distance from the front end face 30. The inlet 38b of the second guide groove 37b is formed to have a distance L1, which is approximately the same as the diameter of the later mentioned spherical body 55a, from the front end face 30. In other words, the inlet 38b of the second guide groove 37b is formed so that the distance from the front end face 30 is the above mentioned L1. The inlet 38c of the third guide groove 37c is formed to have a distance L2, which is approximately double the diameter of the later mentioned spherical body 55a, from the front end face 30. In other words, the inlet 38c of the third guide groove 37c is formed so that the distance from the front end face 30 is the above mentioned L2.

The second cam drum 3b constructed like this is inter-fitted and held on the outer periphery of the fixed drum 2 on the rear side so as to freely rotate around the axis of the fixed drum 2, as FIG. 1 shows.

Now the first cam drum 3a will be described. As FIG. 2 shows, the first cam drum 3a has cam grooves which are formed on the inner periphery surface so as to extend obliquely with respect to the optical axial direction, having a predetermined width.

The cam groove of the first cam drum 3a is constituted by two cam grooves, i.e., a first cam groove 31 and a second cam groove 32 which is disposed behind the first cam groove 31.

Just like the above mentioned third cam groove 33 to the fifth cam groove 35, each of the first cam groove 31 and the second cam groove 32 is constituted by three cam grooves disposed at equal interval in the circumferential direction of the first cam drum 3a, although this is not illustrated.

The cross-sectional views of the first cam groove 31 and the second cam groove 32 have the same configuration as those of the above mentioned third cam groove 33 to fifth cam groove 35.

Just like the second cam drum 3b described above, the first cam drum 3a has a plurality of (three in this embodiment) guide grooves 39a (only one is shown in FIG. 2) having an inlet 39c and connected with the first cam groove 31 and the second cam groove 32, on the inner periphery surface. These guide grooves 39a have approximately the same configuration as the guide grooves 37a to 37c of the second cam drum 3b.

The first cam drum 3a constructed like this is inter-fitted and held on the outer periphery of the fixed drum 2 on the front side so as to freely rotate around the axis of the fixed drum 2, as FIG. 1 shows.

The lens holding frame will now be described. As mentioned above, the lens holding frame has the first lens holding frame 41 to the fifth lens holding frame 45.

As FIG. 1 and FIG. 2 show, the first lens holding frame 41 holds the first lens group 4a on the inner periphery side to be unmovable, and is installed on the radially inner side of the first cam drum 3a, specifically, on the radially inner side of the fixed drum 2 to be movable in the optical axial direction.

The second lens holding frame 42 holds the second lens group 4b on the inner periphery side to be unmovable, and is installed on the radially inner side of the first cam drum 3a, specifically, on the radially inner side of the fixed drum 2, and on the rear side of the first lens holding frame 41 to be movable in the optical axial direction.

The third lens holding frame 43 holds the third lens group 4c on the inner periphery side to be unmovable, and is installed on the radially inner side of the second cam drum 3b, specifically, on the radially inner side of the fixed drum 2 to be movable in the optical axial direction.

The fourth lens holding frame 44 holds the fourth lens group 4d on the inner periphery side to be unmovable, and is installed on the radially inner side of the second cam drum 3b, specifically, on the radially inner side of the fixed drum 2, and on the rear side of the third lens holding frame 43 to be movable in the optical axial direction.

The fifth lens holding frame 45 holds the fifth lens group 4e on the inner periphery side to be unmovable, and is installed on the radially inner side of the second cam drum 3b, specifically, on the radially inner side of the fixed drum 2, and on the rear side of the fourth lens holding frame 44 to be movable in the optical axial direction.

Each of the first lens holding frame 41 to the fifth lens holding frame 45 has a plurality of (three in this embodiment) cam follower installation portions 40 for installing the cam follower 5 on the outer periphery. These cam follower installations portions 40 have a same configuration. The cam follower installation portion 40 of the third lens holding frame 43 will now be described as an example.

As FIG. 4 shows, the cam follower installation portion 40 of this embodiment is constituted by three concave portions having an inner screw portion (female screw portion) 40a, which are disposed at an equal interval on the outer periphery of the third lens holding frame 43 along the circumferential direction.

Referring back to FIG. 1, the sixth lens holding frame 46 holds the sixth lens group 4f on the inner periphery side to be unmovable, and is installed on the rear side of the fixed drum 2 to be unmovable.

The seventh lens holding frame 47 holds the seventh lens group 4g on the inner periphery side to be unmovable, and is installed on the front side of the fixed drum 2 to be unmovable.

The cam follower 5 will now be described. As mentioned above, a plurality (three in this embodiment) of cam followers 5 are installed on each of the first lens holding frame 41 to the fifth lens holding frame 45, therefore a total of 15 cam followers 5 are used.

These cam followers 5 have a same configuration. The cam follower 5 installed on the third lens holding frame 43 will now be described as an example.

The cam follower 5 has a cam follower main body 50, a spherical body 55a as a contact member, and a coil spring 55b as a biasing member, as shown in FIG. 1, FIG. 5 and FIG. 6.

The cam follower main body 50 has a tubular axial portion 51, a cam groove engagement roller 52 which movably engages with the third cam groove 33 of the second cam drum 3b, and a guide groove engagement roller 53 which movably engages with the second guide groove 21b of the fixed drum 2.

The axial portion 51 has, on the outer periphery of the base side thereof in the axial direction, an outer screw portion (male screw portion) 51a that screws into the inner screw portion 40a of the cam follower installation portion 40. The outer screw portion 51a is formed on the outer periphery of a small diameter portion where the diameter is smaller than the outer diameter of the tip side of the axial portion 51 in the axial direction.

The axial portion 51 has a holding portion 51b for holding the spherical body 55a, and a spring housing concave portion 51c for housing a coil spring 55b.

The holding portion 51b is opened, to have a circular cross-section, inside the axial portion 51 with a predetermined depth from the end face of the axial portion 51 in the axial direction. The inner diameter of the holding portion 51b is set to be approximately the same as the outer diameter of the spherical body 55a.

The spring housing concave portion 51c is opened, to have a circular cross-section, with a predetermined depth from the holding portion 51b in the axial direction. The spring housing concave portion 51c is formed to be connected with the holding portion 51b at the back (bottom side) of the holding portion 51b.

The cam groove engagement roller 52 has a cylindrical body, and the diameter of the outer periphery is set to be approximately the same as the distance between the groove front side wall 36a and the groove rear side wall 36b of the third cam groove 33 (groove width of the third cam groove 33). The guide groove engagement roller 53 is constructed by a different cylindrical body from the cam groove engagement roller 52, and the diameter of the outer periphery is set to be approximately the same as the groove width of the second guide groove 21b of the fixed drum 2.

The inner peripheries of the cam groove engagement roller 52 and the guide groove engagement roller 53 are sequentially penetrated by the axial portion 51 from the base side respectively, so that the cam groove engagement roller 52 and the guide groove engagement roller 53 are rotatably disposed around the outer periphery of the axial portion 51.

Now the assembly of the cam follower 5, having this configuration on the first lens holding frame 41 to the fifth lens holding frame 45 will be described taking the third lens holding frame 43 as an example.

In the state where the cam groove engagement roller 52 and the guide groove engagement roller 53 are assembled on the outer periphery of the axial portion 51, the outer screw portion 51a of the axial portion 51 and the guide groove engagement roller 53 are inserted into the second guide groove 21b of the fixed drum 2 from the outer periphery side of the fixed drum 2.

Then the outer screw portion 51a of the axial portion 51 is screwed into the inner screw portion 40a of the cam follower installation portion 40 of the third holding frame 43 installed inside the fixed drum 2 in advance. Thereby the axial portion 51 on which the cam groove engagement roller 52 and the guide groove engagement roller 53 are assembled is installed in the third lens holding frame 43, and the cam follower main unit 50 is installed in the third lens holding frame 43 in a state of being engaged with the second guide groove 21b of the fixed drum 2, as FIG. 6 shows.

In this state, the cam groove engagement roller 52 protrudes outward in the radial direction from the outer periphery of the fixed drum 2, and a contact portion 52a for a step portion, created on the cam groove engagement roller 52, contacts a position maintaining step portion 51d created on the axial portion 51 and maintains its position. The guide groove engagement roller 53 movably engages the second guide groove 21b of the fixed drum 2, and is maintained in this position by the cam groove engagement roller 52 and the third holding frame 43.

Thus the cam follower main unit 50 is installed in the three cam follower installations portions 40 of the third lens holding frame 43.

Now the assembly of the cam followers 5 on the cam drums 3a and 3b will be described with reference to FIG. 7 to FIG. 10. As FIG. 7 shows, the coil spring 55b is housed in the spring housing concave portion 51c of one cam follower main unit 50 (e.g. highest one in FIG. 7) of the three cam follower main units 50 (see FIG. 6), and the spherical body 55a is held in the holding portion 51b.

From this state, the first guide groove 37a of the second cam drum 3b and the second guide groove 21b of the fixed drum 2, on which the spherical body 55a is disposed, are aligned in the circumferential direction, as FIG. 7 shows. In the state where the first guide groove 37a and the second guide groove 21b are aligned in the circumferential direction, the second guide groove 37b and the third guide groove 37c are aligned with the second guide groove 21b in the circumferential direction respectively.

Figure 8:
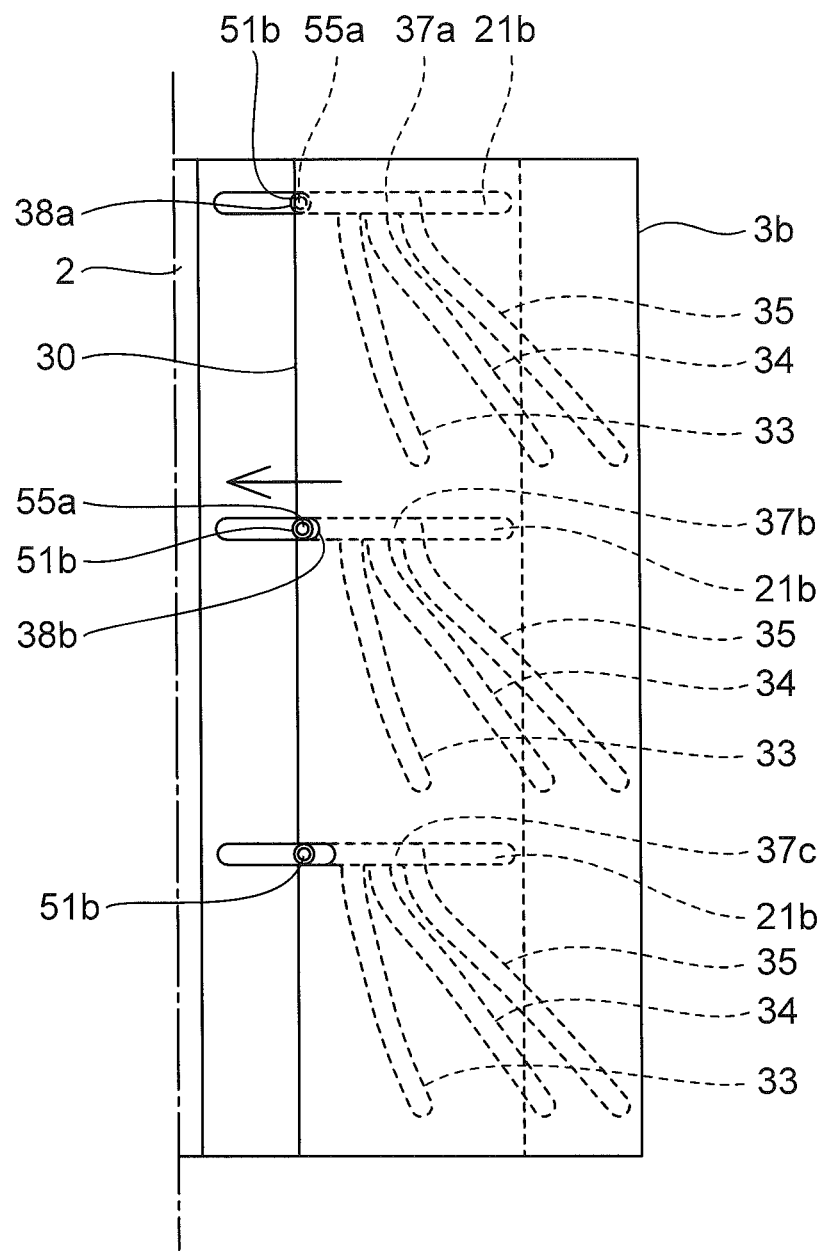
FIG. 8 is a diagram depicting a developed state where the first cam follower installed on the lens holding frame is engaged with the cam drum.
Figure 9:
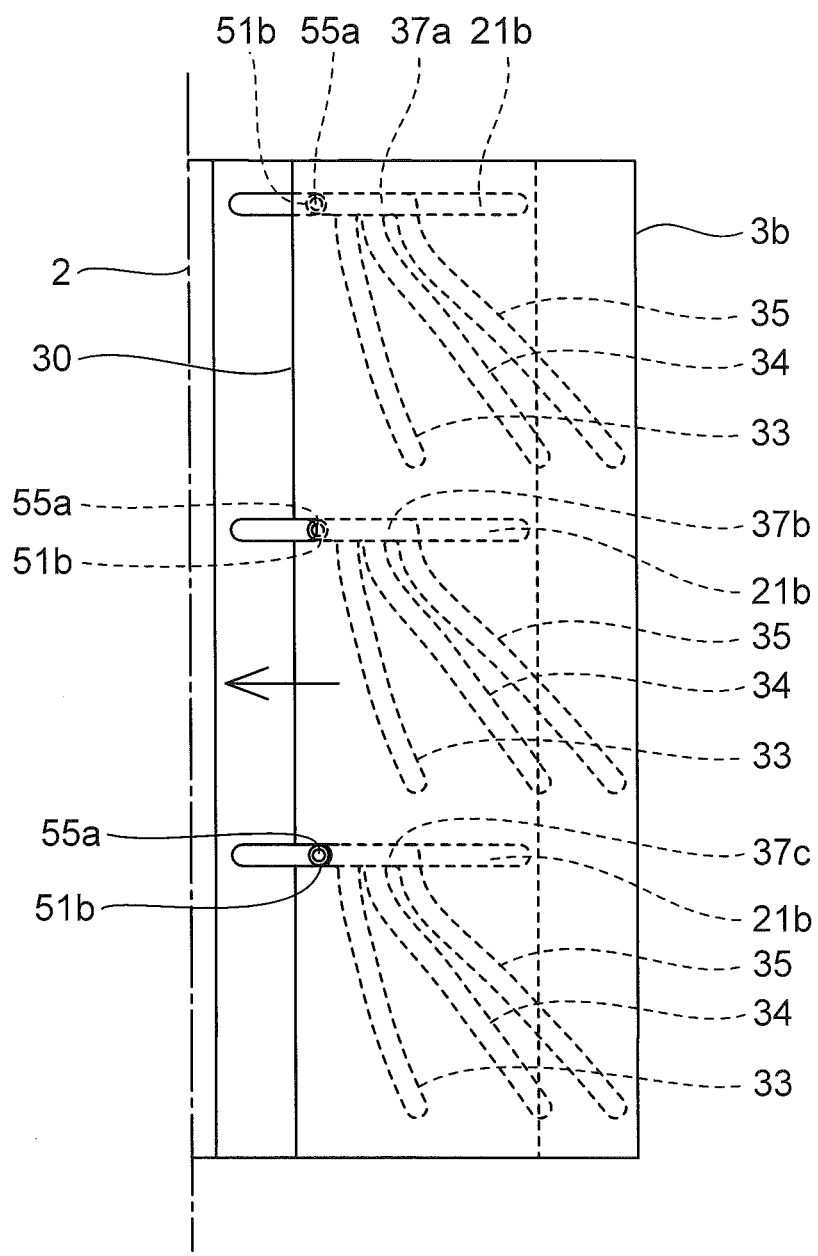
FIG. 9 is a diagram depicting a developed state where the second cam follower installed on the lens holding frame is engaged with the cam drum.

Then as FIG. 8 shows, the fixed drum 2 is inserted into the second cam drum 3b, and the spherical body 55a is inserted into the inlet 38a of the first guide groove 37a against the biasing force of the coil spring 55b.

In this state, the holding portion 51b disposed inside the second guide groove 21b (e.g. center one in FIG. 8) of the fixed drum 2 matching with the second guide groove 37b of the second cam drum 3b is located immediately in front of the inlet 38b of the second guide groove 37b.

The coil spring 55b is housed in the spring housing concave portion 51c of the cam follower main unit 50 and the spherical body 55a is held by the holding portion 51b, and the fixed drum 2 is further inserted into the second cam drum 3b in the axial direction. Thereby the spherical body 55a can be inserted into the inlet 38b of the second guide groove 37b against the emerging force of the coil spring 55b.

In this state, the cam follower main unit 50 disposed inside the second guide groove 21b (e.g. lowest one in FIG. 9) of the fixed drum 2 matching with the third guide groove 37c of the second cam drum 3b is located immediately in front of the inlet 38c of the third guide groove 37c.

Figure 10:
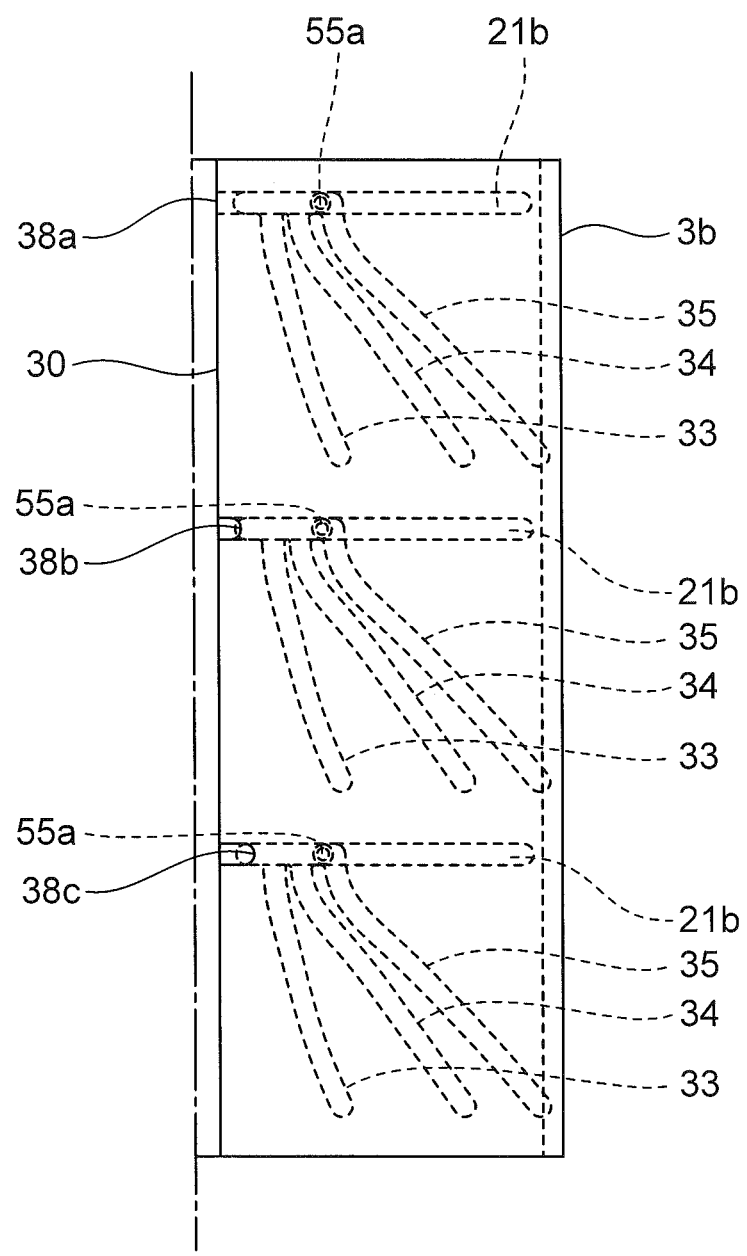
FIG. 10 is a diagram depicting a developed state where the third cam follower installed on the lens holding frame is engaged with the cam drum.

The coil spring 55b is housed in the spring housing concave portion 51c of the cam follower main unit 50, and the spherical body 55a is held by the holding portion 51b, and the fixed drum 2 is further inserted into the second cam drum 3b in the axial direction. Thereby the spherical body 55a can be inserted into the inlet 38c of the third guide groove 37c against the biasing force of the coil spring 55b, as FIG. 10 shows.

If the guide grooves 37a to 37c are not included, for example, the spherical bodies 55a being held by the holding units 51b of the three cam follower main units 50 must be assembled in the three cam follower installations portions 40 at the same time. In this case assembly is difficult, since each spherical body 55a must be held so as to not be ejected out by the biasing force of the coil spring 55b.

According to the present embodiment however, each coil spring 55b can be sequentially housed in each of the cam follower main units 50 installed in the three cam follower installations portions 40 of the third lens holding frame 43, while holding the spherical body 55a in the holding portion 51b, this makes assembly easy.

Therefore the cam follower 5 can be installed on the third lens holding frame 43, and the cam groove engagement roller 52 of the cam follower 5 is engaged with the third cam groove 33 of the second cam drum 3b, and the guide engagement roller 53 is engaged with the second guide groove 21b of the fixed drum 2.

In this state, the spherical body 55a of the cam follower 5 is pressed against the inclined wall 36c of the third cam groove 33 by the biasing force of the coil spring 55b, and the spherical body 55a is inserted between the inclined wall 36c and the axial portion 51. As a result, because of the spherical body 55a, the cam groove engagement roller 52 is pressed against the groove rear side wall 36b of the third cam groove 33 via the axial portion 51.

As a consequence, the cam follower 5 having this configuration is always maintained in a state of being pressed against the groove rear side wall 36b of the third cam groove 33, and backlashing of the third cam groove 33, that is backlashing in the axial direction, is rarely generated, and the third lens holding frame 43 rarely inclines with respect to the second cam drum 3b.

The axial portion 51 of the cam follower 5 presses the third lens holding frame 43 inward in the radial direction by the biasing force of the coil spring 55b. Therefore backlashing in the radial direction is rarely generated in the third lens holding frame 43.

As described above, in the lens unit 1, where the first lens holding frame 41 to the fifth lens holding frame 45 are assembled, the second cam drum 3b rotates by the rotation of a second cam drum operation ring 6b which is disposed on the outer periphery of the second cam drum 3b, and which is engaged with the second cam drum 3b so as to not rotate, for example, as FIG. 1.

As the second cam drum 3b rotates, the cam groove engagement roller 52 of the cam follower 5 disposed on the third lens holding frame 43 rolls in the third cam groove 33 of the second cam drum 3b, and the guide groove engagement roller 53 rolls in the second guide groove 21b of the fixed drum 2.

On rolling, the cam groove engagement roller 52 rolls while maintaining the state of being pressed against the groove rear side wall 36b of the third cam groove 33 by the spherical body 55a via the axial portion 51, hence the third lens holding frame 43 moves without inclining with respect to the cam drum, and without generating backlashing in the radial direction.

The cam follower 5 installed on the fourth lens holding frame 44 rolls in the second guide groove 21b of the fixed drum 2 and the fourth cam groove 34 of the second cam drum 3b, whereby the fourth lens holding frame 44 moves in the optical axial direction. The cam follower 5 installed on the fifth lens holding frame 45 rolls in the second guide groove 21*b* of the fixed drum 2 and the fifth cam groove 35 of the second cam drum 3*b*, whereby the fifth lens holding frame 45 moves in the optical axial direction. In these cases as well, the fourth lens holding frame 44 and the fifth lens holding frame 45 move without inclining with respect to the cam drum, and without generating backlashing in the radial direction, just like the case of the third lens holding frame 43.

The first cam drum 3*a* and the first cam drum operation ring 6*a* are engaged so as to not rotate, for example, as FIG. 1 shows, and the first cam drum 3*a* rotates by rotation of the first cam drum operation ring 6*a* disposed on the outer periphery of the first cam drum 3*a*.

As the first cam drum 3*a* rotates, the cam groove engagement roller 52 of the cam follower 5 disposed on the first lens holding frame 41 and the second lens holding frame 42 rolls in the first cam groove 31 and the second cam groove 32 of the first cam drum 3*a*, and the guide groove engagement roller 53 rolls in the first guide groove 21*a* of the fixed drum 2.

On rolling as well, the cam groove engagement roller 52 rolls maintaining the state of being pressed against the groove rear side wall 36*b* of the first cam groove 31 and the second cam groove 32 by the spherical body 55*a* via the axial portion 51, hence the first lens holding frame 41 and the second lens holding frame 42 move without inclining with respect to the cam drum, and without generating backlashing in the radial direction. The first cam drum operation ring 6*a* and the second cam drum operation ring 6*b* may be manually rotated, or be rotated by such a driving member as a motor.

Figure 11:
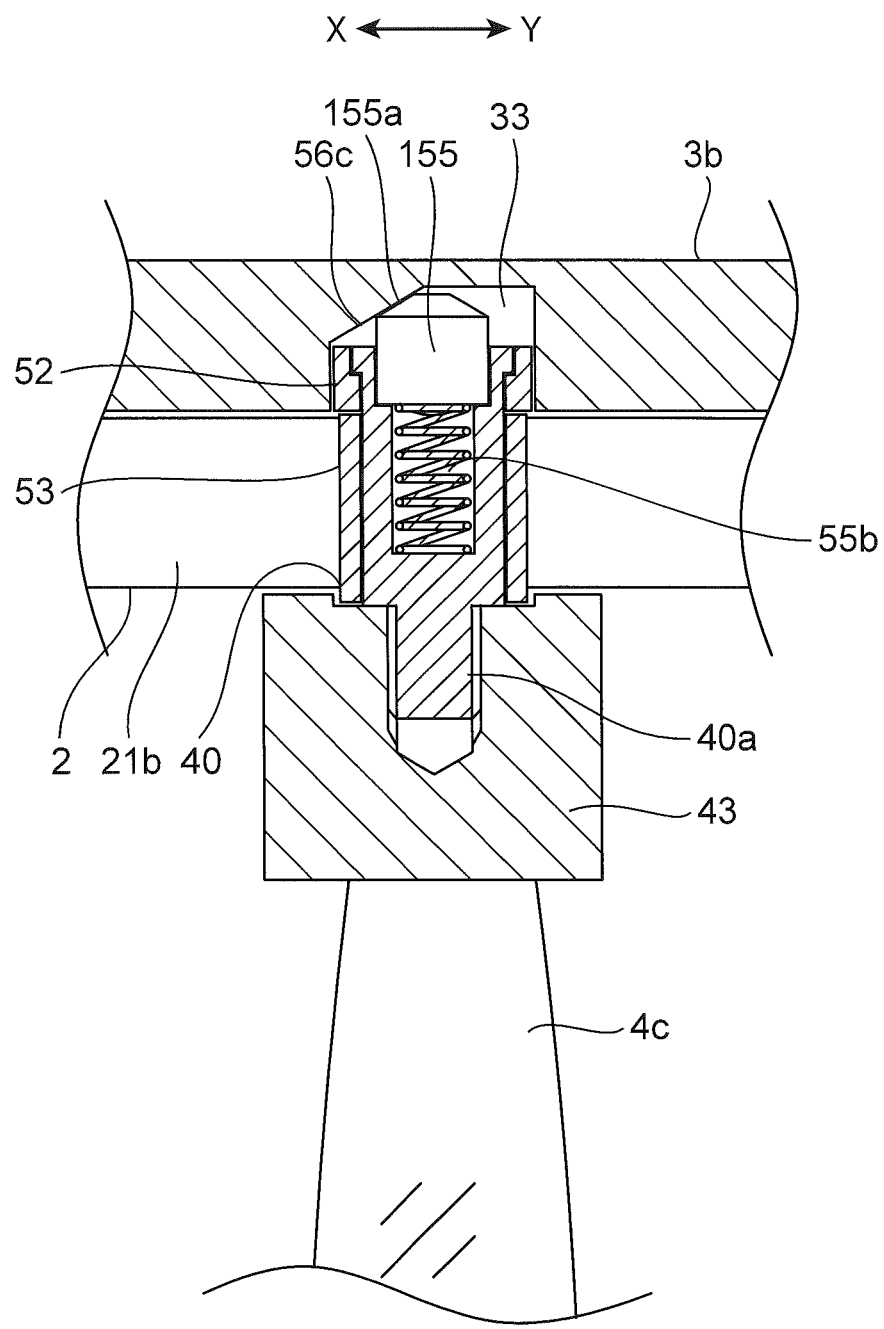
FIG. 11 is an enlarged cross-sectional view depicting a key section in a state where a cam follower of another embodiment is engaged with the fixed drum and the cam drum.

In the above embodiment, the spherical body is used as the contact member, but the present invention is not limited to this, and appropriate modifications can be made. For example, as FIG. 11 shows, the contact member may be constituted by a cylindrical columnar body 155 having a tapered portion 155*a* of which diameter decreases as the tip is approached.

In the case of the cam follower 5 of this embodiment, the tip of the holding unit of the axial portion of the cam follower is open, and the contact member is ejected from the holding unit to the tip side by the biasing force of the coil spring, but the present invention is not limited to this, and appropriate modifications can be made.

For example, the cam follower 5 may have an ejection prevention portion on the axial portion that prevents the contact member from being ejected from the holding unit by the biasing force of the coil spring.

Figure 12A:
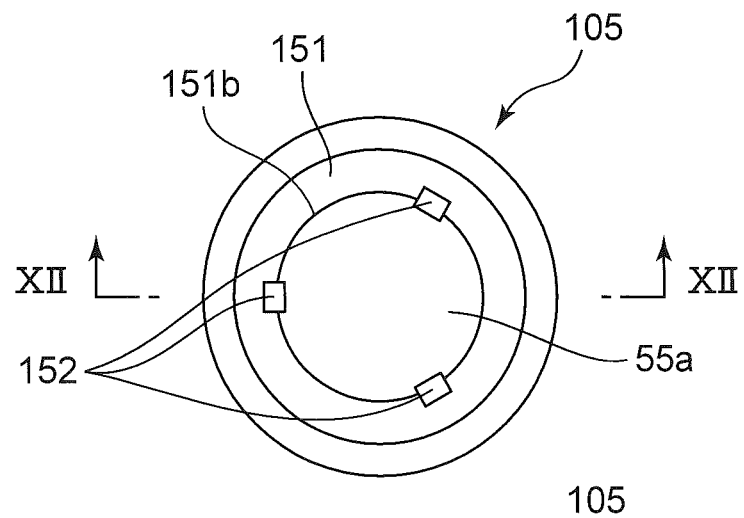
FIG. 12A is a plan view of a cam follower according to still another embodiment.
Figure 12B:
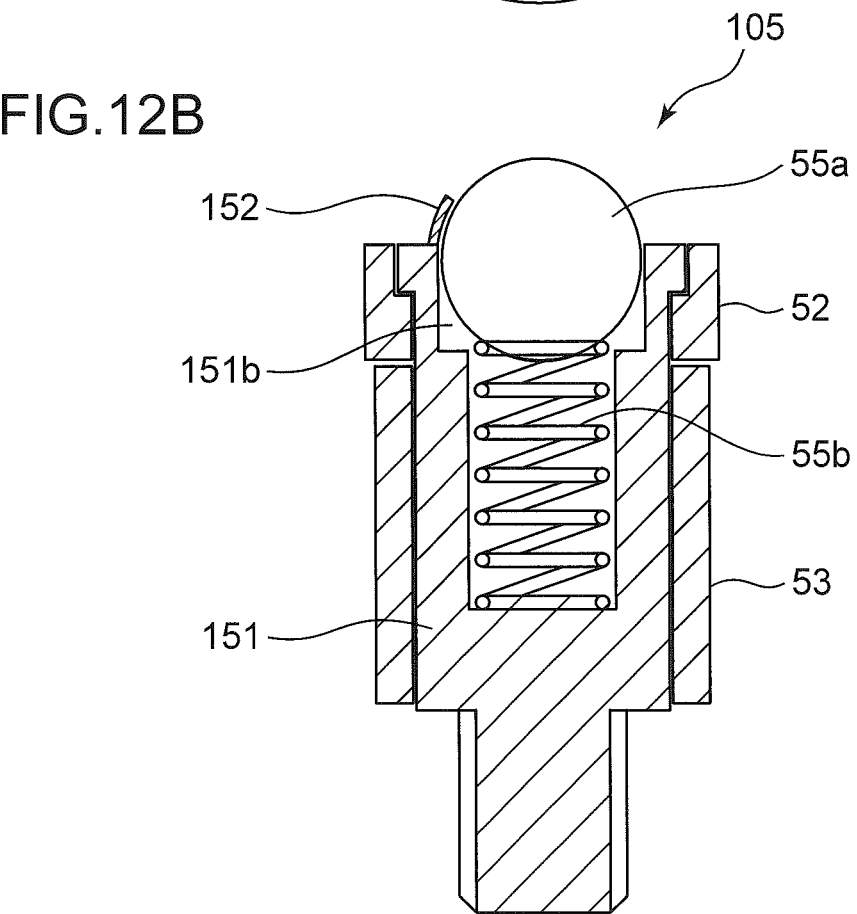
FIG. 12B is a cross-sectional view sectioned at the XII-XII line in FIG. 12A.

More specifically, as FIG. 12 shows, the cam follower 105 has an ejection prevention piece 152 as the ejection prevention portion constituted by a flexible plate piece at three locations on the periphery of the holding unit 151*b* at the tip of the axial portion 151, for example. In the case of the cam follower 105 having this configuration, the ejection prevention piece 152 can prevent the ejection of the spherical body 55*a* as the contact member from the holding unit 151*b* by the biasing force of the coil spring 55*b*.

Figure 13A:
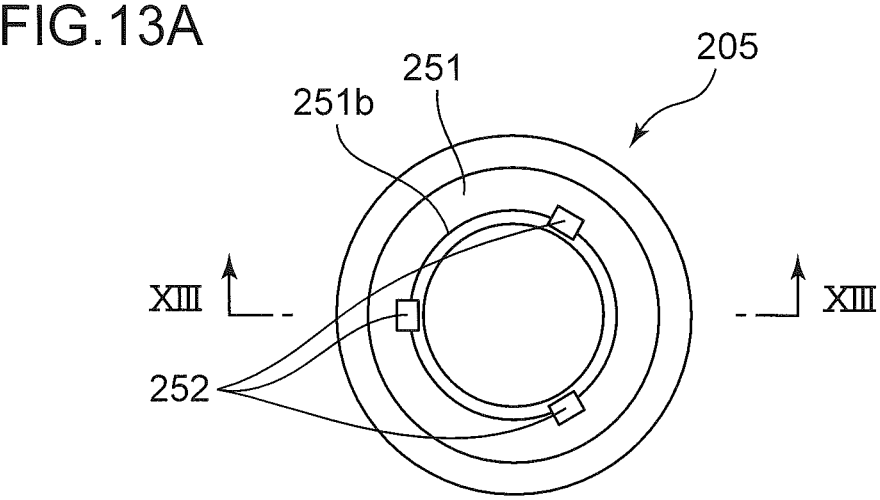
FIG. 13A is a plan view of a cam follower according to still another embodiment.
Figure 13B:
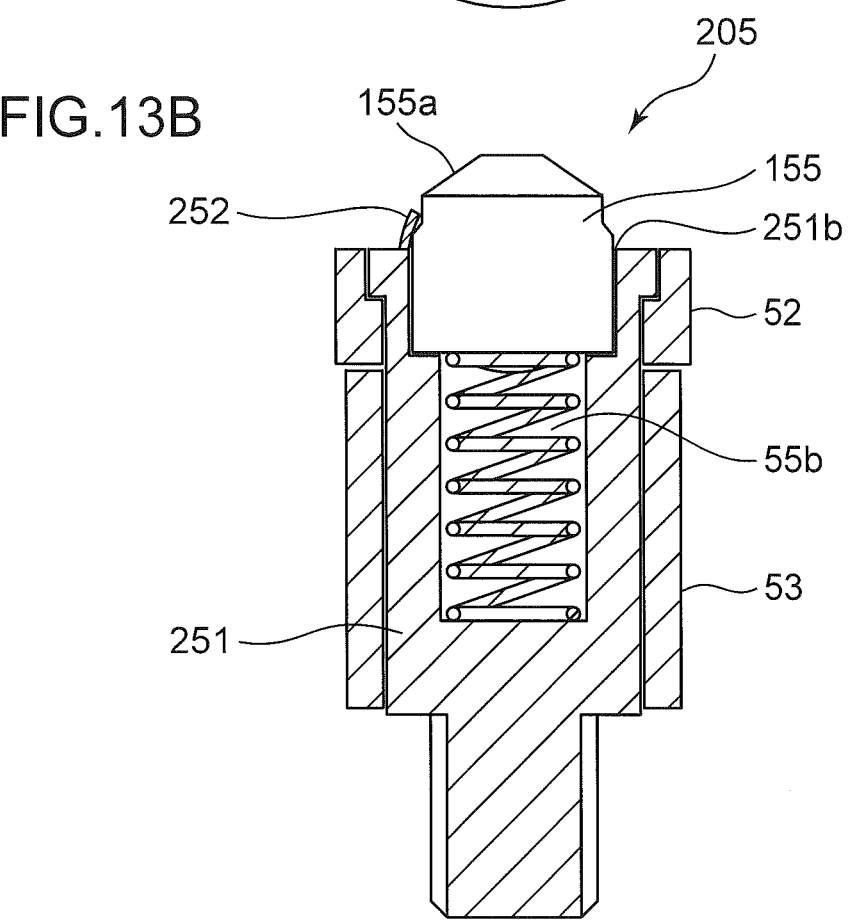
FIG. 13B is a cross-sectional view sectioned at the XIII-XIII line in FIG. 13A.

For another example, as FIG. 13 shows, the cam follower 205 has an ejection prevention piece 252 as the ejection prevention portion constituted by the flexible plate piece at three locations on the periphery of the holding unit 251*b* at the tip of the axial portion 251. In the case of the cam follower 205 having this configuration, the ejection prevention piece 252 can prevent the ejection of the cylindrical columnar body 155 as the contact member having the taper portion 155*a* from the holding unit 251*b* by the biasing force of the coil spring 55*b*.

The cylindrical columnar body 155 shown in FIG. 13 has a step portion to be engaged with the ejection prevention piece 252 on the outer circumferential surface of the cylindrical columnar body 155.

Thus by creating the ejection prevention portion so that the contact member is not ejected from the holding unit, the three cam followers 105 can be easily inserted into the first guide groove 37*a* to the third guide groove 37*c* respectively, and each cam follower can be easily inserted in each cam groove of the cam drum from the first guide groove 37*a* to the third guide groove 37*c* respectively, even if the distances of the inlets 38*a* to 38*c* of the first guide groove 37*a* to the third guide groove 37*c* from the front end face of the second cam drum 3*b* are set to be a same value. Therefore in the case of a cam follower having this configuration, the first guide groove 37*a* to the third guide groove 37*c* can be easily formed.

The above embodiment is applied to a lens unit for imaging, but may also be applied to a lens unit for projection, and appropriate modifications can be made.

The specification discloses the aforementioned arrangements. The following is a summary of the primary arrangements of the embodiments.

A lens barrel according to an aspect is a lens barrel including: a cam drum having a cam groove, a lens holding frame for holding a moving lens group, and a cam follower installed on an outer periphery of the lens holding frame, the lens barrel being configured such that the cam follower engaged with the cam groove moves along the cam groove, and the lens holding frame thereby moves in an axial direction of the cam drum, wherein the cam groove has two groove side walls that are disposed facing each other with a distance in the axial direction, and an inclined wall that extends outward in a radial direction of the cam drum from one of the groove side walls to the other thereof, and the cam follower has a cam follower main unit that is disposed between the two groove side walls so as to be contactable with the other of the groove side walls, a contact member that contacts the inclined wall and the cam follower main unit respectively, and a biasing member that biases the contact member outward in the radial direction.

According to this configuration, the contact member is pressed against the inclined wall by the biasing force of the biasing member. Since the inclined wall extends toward the other of the groove side walls, outward in the radial direction, the contact member is also pressed against the cam follower main unit. Since the contact member is pressed against the cam follower main unit, the cam follower main unit is pressed against the other of the groove side walls.

Thereby in the case of the lens barrel having this configuration, the cam follower main unit can always be pressed against the other of the groove side walls. Therefore this lens barrel can suppress backlashing of the lens holding frame that is generated in the radial direction and the axial direction of the cam drum. Hence this lens barrel can maintain this state upon moving the lens holding frame with respect to the cam drum, and can suppress the lens holding from inclining with respect to the cam drum.

According to another aspect, in the above mentioned lens barrel, the lens barrel further includes a fixed drum having a guide groove with which the cam follower is movably engaged, wherein the cam follower main unit has an axial portion and a roller that is rotatably disposed on an outer periphery side of the axial portion, and the roller has a cam groove engagement roller that is engaged with the cam groove, and a guide groove engagement roller that is engaged with the guide groove, and is different from the cam groove engagement roller.

If this configuration is used, the cam groove engagement roller can roll along the groove side wall of the cam groove, and the guide groove engagement roller can roll along the guide groove side wall, upon moving of the lens holding frame, and the lens barrel having this configuration can smoothly move the lens holding frame.

According to another aspect, in the above mentioned lens barrels, the contact member is a spherical body in the lens barrel. If this configuration is used, the spherical body can easily press the cam follower main unit against the cam groove side wall of the cam groove with certainty using the biasing force of the biasing member.

According to another aspect, in the above mentioned lens barrels, the contact member is gradually formed into a tapered shape, as the contact member extends from a portion thereof in contact with the cam follower main unit toward the tip thereof in contact with the inclined wall. If this configuration is used, the inclined wall contact portion can easily press the cam follower main unit against the cam groove side wall of the cam groove with certainty using the biasing force of the biasing member.

According to another aspect, in the above mentioned lens barrel, the cam follower main unit has a housing concave portion that houses the biasing member and a holding unit that is disposed on a tip side of the housing concave portion so as to be connected with the housing concave portion, and that holds the contact member, and the holding unit has a removal prevention portion for preventing the held contact member from being removed from the holding unit by a biasing force of the biasing member.

The lens barrel having this configuration can use the removal prevention portion to keep the contact member held by the holding unit from not being ejected from the holding unit by the biasing force of the biasing member, and maintain that the contact member is always in the held state. This makes it easy to assemble this cam follower in the lens holding frame, or to assemble the lens holding frame, assembled with the cam follower, in the cam drum.

According to another aspect, in the above mentioned lens barrels, the cam follower in this lens barrel is constituted by a plurality of cam followers disposed in a circumferential direction of the lens holding frame, the cam drum has a cam drum main unit, the cam groove is formed on an inner periphery surface of the cam drum main unit in the number corresponding to the number of cam followers, the cam drum main unit has a plurality of guide grooves which are connected to the plurality of cam grooves respectively, and each of which has an inlet for guiding each of the plurality of cam followers to each of the cam grooves, and the plurality of inlets are configured so that distances of the respective inlets from an end face of the cam drum main unit are different from each other.

In the case of the lens barrel having this configuration, when the contact members of the plurality of cam followers are inserted into the cam grooves in a pressed state against the biasing member, each cam follower can be pressed and inserted into the respective cam groove sequentially, without pressing the plurality of cam followers at the same time. Therefore the lens barrel having this configuration makes it easy to assemble the cam followers in the cam drum by inserting the cam followers into the cam grooves.

A lens unit according to another aspect includes one of the above mentioned lens barrels, and one or a plurality of lenses held in the lens barrel.

According to this configuration, the contact member is pressed against the inclined wall by the biasing force of the biasing member. Since the inclined wall extends toward the other of the groove side walls, outward in the radial direction, the contact member is also pressed against the cam follower main unit. Since the contact member is pressed against the cam follower main unit, the cam follower main unit is pressed against the other of the groove side walls.

Thereby in the case of the lens unit having this configuration, the cam follower main unit can always be pressed against the other of the groove side walls. Therefore this lens unit can suppress backlashing of the lens holding frame that is generated in the radial direction and the axial direction of the cam drum. Hence this lens unit can maintain the state upon moving the lens holding frame with respect to the cam drum, and can suppress the lens holding frame from inclining with respect to the cam drum.

This application is based on Japanese Patent application No. 2011-205884 filed in Japan Patent Office on Sep. 21, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A lens barrel comprising:
   a cam drum having a cam groove;
   a lens holding frame for holding a moving lens group; and
   a cam follower installed on an outer periphery of the lens holding frame,
   the lens barrel being configured such that the cam follower engaged with the cam groove moves along the cam groove, and the lens holding frame thereby moves in an axial direction of the cam drum, wherein
   the cam groove has two groove side walls that are disposed facing each other with a distance in the axial direction, and an inclined wall that extends outward in a radial direction of the cam drum from one of the groove side walls to the other thereof,
   the cam follower has a cam follower main unit that is disposed between the two groove side walls so as to be contactable with the other of the groove side walls, a contact member that contacts the inclined wall and the cam follower main unit respectively, and a biasing member that biases the contact member outward in the radial direction; and
   the cam follower main unit has an axial portion and a roller that is rotatably disposed on an outer periphery side of the axial portion.

2. The lens barrel according to claim 1, further comprising a fixed drum having a guide groove with which the cam follower is movably engaged, wherein
   the roller has a cam groove engagement roller that is engaged with the cam groove, and a guide groove engagement roller that is engaged with the guide groove, and is different from the cam groove engagement roller.

3. The lens barrel according to claim 2, wherein
   the contact member is a spherical body.

4. The lens barrel according to claim 2, wherein
   the contact member is gradually formed into a tapered shape, as the contact member extends from a portion thereof in contact with the cam follower main unit toward the tip thereof in contact with the inclined wall.

5. The lens barrel according to claim 2, wherein
   the cam follower main unit has a housing concave portion that houses the biasing member and a holding unit that is disposed on a tip side of the housing concave portion so as to be connected with the housing concave portion, and that holds the contact member, and the holding unit has an ejection prevention portion for preventing the held contact member from being ejected from the holding unit by a biasing force of the biasing member.

6. The lens barrel according to claim 2, wherein the cam follower is constituted by a plurality of cam followers disposed in a circumferential direction of the lens holding frame, the cam drum has a cam drum main unit, the cam groove is formed on an inner periphery surface of the cam drum main unit in the number corresponding to the number of cam followers, the cam drum main unit has a plurality of guide grooves which are connected to the plurality of cam grooves respectively, and each of which has an inlet for guiding each of the plurality of cam followers to each of the cam grooves, and the plurality of inlets are configured so that distances of the respective inlets from an end face of the cam drum main unit are different from each other.

7. A lens unit comprising:

the lens barrel according to claim 2; and one or a plurality of lenses held in the lens barrel.

8. The lens barrel according to claim 1, wherein the contact member is a spherical body.

9. The lens barrel according to claim 8, wherein the cam follower main unit has a housing concave portion that houses the biasing member and a holding unit that is disposed on a tip side of the housing concave portion so as to be connected with the housing concave portion, and that holds the contact member, and the holding unit has an ejection prevention portion for preventing the held contact member from being ejected from the holding unit by a biasing force of the biasing member.

10. The lens barrel according to claim 8, wherein the cam follower is constituted by a plurality of cam followers disposed in a circumferential direction of the lens holding frame, the cam drum has a cam drum main unit, the cam groove is formed on an inner periphery surface of the cam drum main unit in the number corresponding to the number of cam followers, the cam drum main unit has a plurality of guide grooves which are connected to the plurality of cam grooves respectively, and each of which has an inlet for guiding each of the plurality of cam followers to each of the cam grooves, and the plurality of inlets are configured so that distances of the respective inlets from an end face of the cam drum main unit are different from each other.

11. A lens unit comprising:

the lens barrel according to claim 8; and one or a plurality of lenses held in the lens barrel.

12. The lens barrel according to claim 1, wherein the contact member is gradually formed into a tapered shape, as the contact member extends from a portion thereof in contact with the cam follower main unit toward the tip thereof in contact with the inclined wall.

13. The lens barrel according to claim 12, wherein the cam follower main unit has a housing concave portion that houses the biasing member and a holding unit that is disposed on a tip side of the housing concave portion so as to be connected with the housing concave portion, and that holds the contact member, and the holding unit has an ejection prevention portion for preventing the held contact member from being ejected from the holding unit by a biasing force of the biasing member.

14. The lens barrel according to claim 12, wherein the cam follower is constituted by a plurality of cam followers disposed in a circumferential direction of the lens holding frame, the cam drum has a cam drum main unit, the cam groove is formed on an inner periphery surface of the cam drum main unit in the number corresponding to the number of cam followers, the cam drum main unit has a plurality of guide grooves which are connected to the plurality of cam grooves respectively, and each of which has an inlet for guiding each of the plurality of cam followers to each of the cam grooves, and the plurality of inlets are configured so that distances of the respective inlets from an end face of the cam drum main unit are different from each other.

15. A lens unit comprising:

the lens barrel according to claim 12; and one or a plurality of lenses held in the lens barrel.

16. The lens barrel according to claim 1, wherein the cam follower main unit has a housing concave portion that houses the biasing member and a holding unit that is disposed on a tip side of the housing concave portion so as to be connected with the housing concave portion, and that holds the contact member, and the holding unit has an ejection prevention portion for preventing the held contact member from being ejected from the holding unit by a biasing force of the biasing member.

17. The lens barrel according to claim 16, wherein the cam follower is constituted by a plurality of cam followers disposed in a circumferential direction of the lens holding frame, the cam drum has a cam drum main unit, the cam groove is formed on an inner periphery surface of the cam drum main unit in the number corresponding to the number of cam followers, the cam drum main unit has a plurality of guide grooves which are connected to the plurality of cam grooves respectively, and each of which has an inlet for guiding each of the plurality of cam followers to each of the cam grooves, and the plurality of inlets are configured so that distances of the respective inlets from an end face of the cam drum main unit are different from each other.

18. A lens unit comprising:

the lens barrel according to claim 16; and one or a plurality of lenses held in the lens barrel.

19. The lens barrel according to claim 1, wherein the cam follower is constituted by a plurality of cam followers disposed in a circumferential direction of the lens holding frame, the cam drum has a cam drum main unit, the cam groove is formed on an inner periphery surface of the cam drum main unit in the number corresponding to the number of cam followers, the cam drum main unit has a plurality of guide grooves which are connected to the plurality of cam grooves respectively, and each of which has an inlet for guiding each of the plurality of cam followers to each of the cam grooves, and the plurality of inlets are configured so that distances of the respective inlets from an end face of the cam drum main unit are different from each other.

20. A lens unit comprising:
the lens barrel according to claim 19; and
one or a plurality of lenses held in the lens barrel.

21. A lens unit comprising:
the lens barrel according to claim 1; and
one or a plurality of lenses held in the lens barrel.

* * * * *